United States Patent
Banipal et al.

(10) Patent No.: US 11,651,013 B2
(45) Date of Patent: May 16, 2023

(54) CONTEXT-BASED TEXT SEARCHING

(71) Applicant: International Business Machines Corporation, Armonk, NY (US)

(72) Inventors: Indervir Singh Banipal, Austin, TX (US); Shikhar Kwatra, San Jose, CA (US); Rodrigo Goulart Silva, Raleigh, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 17/142,295

(22) Filed: Jan. 6, 2021

(65) Prior Publication Data

US 2022/0215047 A1   Jul. 7, 2022

(51) Int. Cl.
*G06F 7/00* (2006.01)
*G06F 16/33* (2019.01)
*G06N 20/00* (2019.01)
*G06F 16/338* (2019.01)

(52) U.S. Cl.
CPC ........ *G06F 16/3344* (2019.01); *G06F 16/338* (2019.01); *G06N 20/00* (2019.01)

(58) Field of Classification Search
CPC ............... G06F 16/3344; G06F 16/338; G06F 16/3338; G06F 16/3322; G06F 16/319; G06F 16/313; G06N 20/00
See application file for complete search history.

(56) References Cited

U.S. PATENT DOCUMENTS

| | | |
|---|---|---|
| 6,438,545 B1 | 8/2002 | Beauregard et al. |
| 7,900,228 B2 | 3/2011 | Stark et al. |
| 8,452,769 B2 | 5/2013 | Altaf et al. |
| 8,484,100 B2 | 7/2013 | Feldman et al. |
| 10,552,539 B2 | 2/2020 | Bachmann et al. |
| 2007/0136251 A1* | 6/2007 | Colledge ............. G06F 16/3322 |
| 2008/0195601 A1* | 8/2008 | Ntoulas ................. G06F 16/319 707/999.005 |
| 2010/0082570 A1 | 4/2010 | Altaf et al. |
| 2014/0149401 A1* | 5/2014 | Liu ....................... G06F 16/319 707/723 |
| 2014/0280050 A1* | 9/2014 | Hadatsuki ........... G06F 16/3338 707/722 |
| 2016/0012054 A1 | 1/2016 | Franceschini et al. |

(Continued)

FOREIGN PATENT DOCUMENTS

CN   100495392 C   6/2009

OTHER PUBLICATIONS

Lee, Y. "Systematic Homonym Detection and Replacement Based on Contextual Word Embedding", Accepted: Oct. 9, 2020, 20 pages.

(Continued)

*Primary Examiner* — Mohammad A Sana
(74) *Attorney, Agent, or Firm* — James L. Olsen

(57) ABSTRACT

A request is received from a user to search a document for at least one search term. The document is analyzed to determine contextual meanings associated with the at least one search term. An ordered set of contexts of the at least one search term is constructed. An option of disambiguation is then prompted to the user to select a context of the ordered set of contexts. Search results are presented to the user associated with the selected context of the at least one search term.

17 Claims, 8 Drawing Sheets

(56) References Cited

U.S. PATENT DOCUMENTS

2017/0177180 A1 6/2017 Bachmann et al.
2021/0191925 A1* 6/2021 Sianez ................. G06N 5/04

OTHER PUBLICATIONS

Thomas, R., "How to Rank Text Content by Semantic Similarity", May 10, 10 pages.
Devlin et al., "BERT: Pre-training of Deep Bidirectional Transformers for Language Understanding", May 24, 2019, 16 pages.
Mell et al., "The NIST Definition of Cloud Computing", Recommendations of the National Institute of Standards and Technology, Sep. 2011, 7 pages.
Unknown, "twinword finder—It's time to ditch Ctrl+F!", printed Jan. 5, 2021, 4 pages.

* cited by examiner

CONTEXT-BASED TEXT SEARCHING

BACKGROUND

The present disclosure relates generally to the field of text searching, and in particular, to context-based text searching.

SUMMARY

Embodiments of the present disclosure are directed to a method, system, and computer program product for context-based text searching. A request can be received from a user to search a document for at least one search term. The document can be analyzed to determine contextual meanings associated with the at least one search term. An ordered set of contexts of the at least one search term can be constructed. An option of disambiguation can be prompted to the user to select a context of the ordered set of contexts. Search results can then be presented to the user associated with the selected context of the at least one search term.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
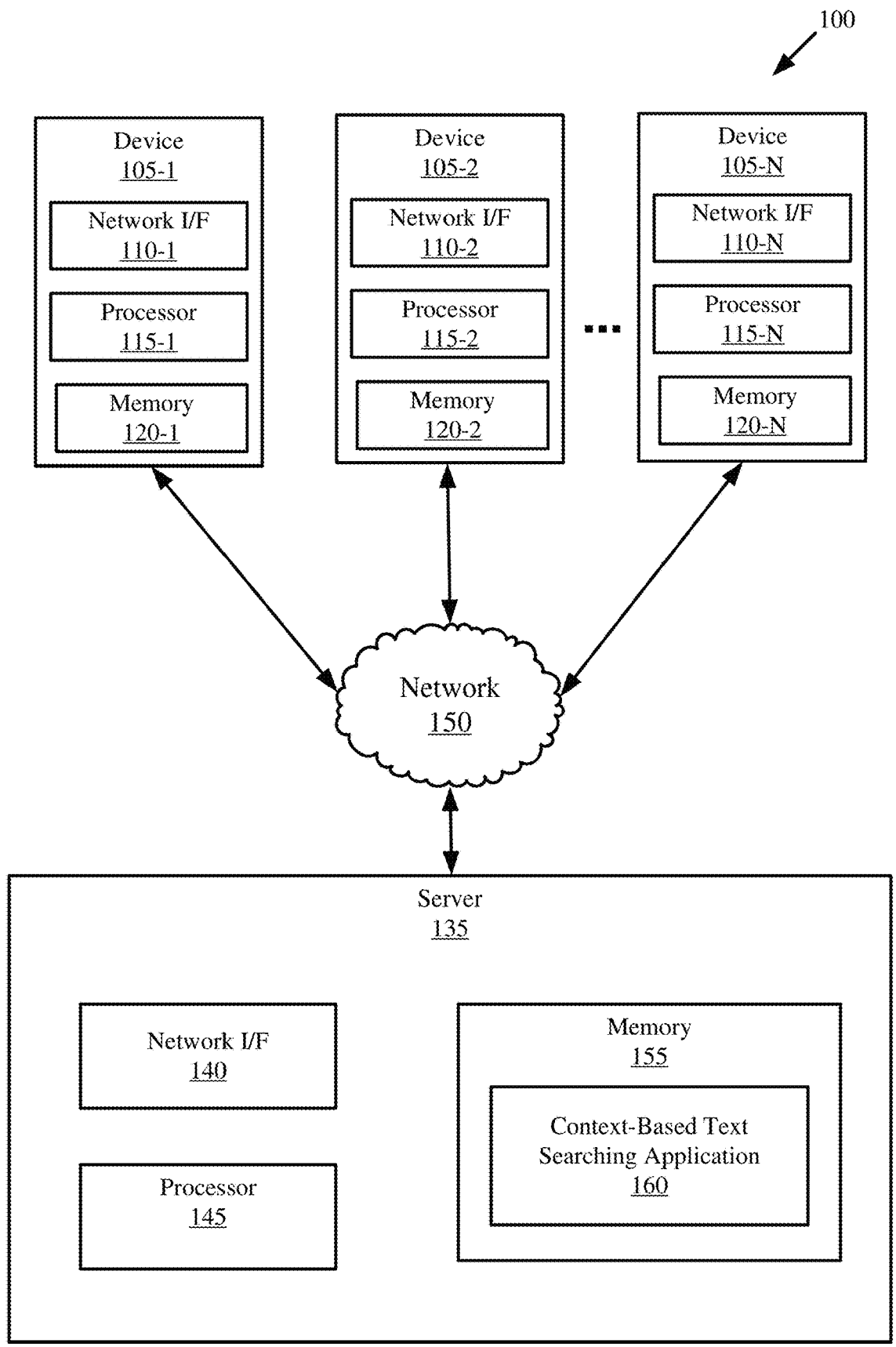
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of text searching, and in particular, to context-based text searching. While the present disclosure is not necessarily limited to such applications, various aspects of the disclosure can be appreciated through a discussion of various examples using this context.

There are many tools that allow users to search for particular keywords or phrases within a text document. These tools are typically initiated by user command (e.g., "Ctrl F") and prompt the user to input a text string to search. Instances of the text string within the text document can then be displayed to (e.g., highlighted) the user, and the user can navigate to different instances of the text string.

However, these tools overlook different contextual meanings of the input text string and may return all associated "hits" within a document regardless of different contextual meanings of the input text string that may be present in the document. For example, if a user searches for a term "Brussels," all instances of the term "Brussels" would be returned to the user. However, "Brussels" may exist within the document in two different contexts: the vegetable, "Brussels Sprouts," and the city, "Brussels." Thus, if a user desires to search for the city, "Brussels," the user may undesirably receive search results for the leafy green vegetable, "Brussels Sprouts."

Additionally, existing search tools may not return text that is substantially similar (e.g., semantically similar) to the input text string. For example, if a user desires to search for "Blue Whale" within a text document, search results will only be returned for text having an exact string match "Blue Whale." However, other synonymous terms such as "*Balaenoptera musculus*" and "sulphur-bottom whale" may be present within the text document. As such, there is a need for a context-based search tool that considers contextual meanings of an input search term as well as semantically similar search terms when returning search results.

Aspects of the present disclosure relate to context-based text searching. A request can be received from a user to search a document for at least one search term. The document can be analyzed to determine contextual meanings associated with the at least one search term. An ordered set of contexts of the at least one search term can be constructed. A disambiguation option can be prompted to the user to select a context of the ordered set of contexts. Search results can then be presented to the user associated with the selected context of the at least one search term.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively, devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively, memories 120) and 155, respectively. The devices 105 and the server 135 can be configured to communicate with each other through internal or external network interfaces 110-1, 110-2 . . . 110-N (collectively, network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a context-based text searching application 160. The context-based searching application 160 can be configured to receive a request from a user to search a document for a search term (e.g., a keyword or phrase). The context-based text searching application 160 can then analyze the document (e.g., using an ontological-based and/or natural language processing (NLP) methods) to determine contextual meanings associated with the search term. An ordered set of contexts of the search term can then be constructed. In embodiments, the set of contexts can be ordered based on relevancy with respect to the document. In some embodiments, the set of contexts can be ordered based on previous training data (e.g., supervised learning data indicating previous context selections by the user). The user can then be prompted to select a context of the ordered set of contexts, for example, by displaying the ordered set of contexts on a graphical user interface (GUI).

The context-based text searching application 160 can then be configured to receive a context selection (disambiguation) from the user. Upon receiving the context selection (e.g., or alternatively, upon determining the various contextual meanings of the search term), semantically similar terminology related to the selected context within the document can be determined. In embodiments, semantically similar terminology can be determined using bidirectional encoder representations from transformers (BERT), term frequency-inverse document frequency (TF-idf), topological similarity (e.g., node-based and edge-based similarity based on an ontological structure), statistical similarity (e.g., a vector-based model such as latent semantic analysis (LSA)) and/or other methodologies. Search results related to the selected context, including terms determined to be semantically similar to the selected context, can then be displayed to the user.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
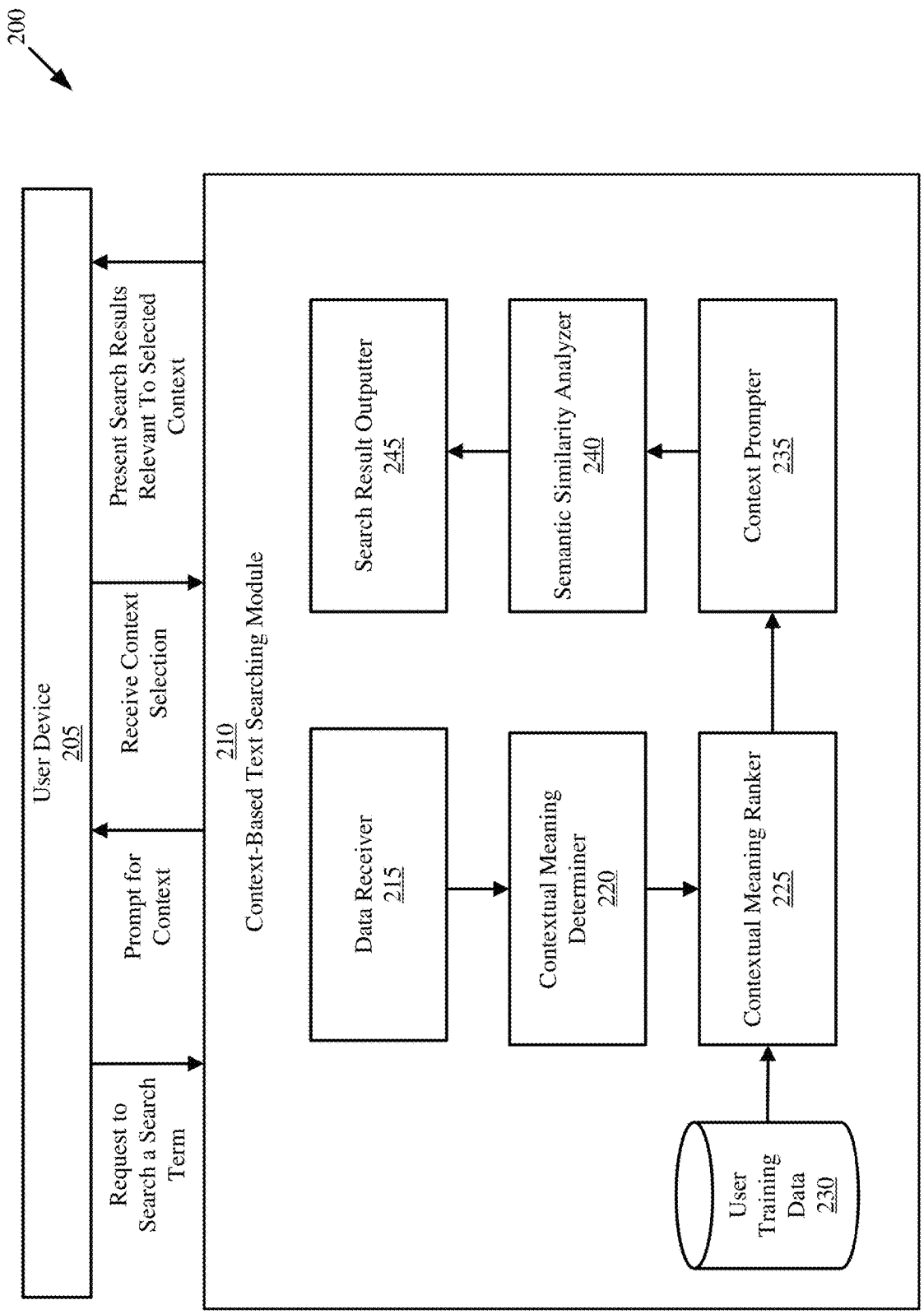
FIG. 2 is a block diagram illustrating a context-based text searching module communicatively coupled to a device, in accordance with embodiments of the present disclosure.

Referring now to FIG. 2, illustrated is a block diagram of an example computing environment 200 in which illustrative embodiments of the present disclosure can be implemented. The computing environment 200 includes a user device 205 communicatively coupled to a context-based text searching module 210. The various components of the context-based text searching module 210 (e.g., data receiver 215, contextual meaning determiner 220, contextual meaning ranker 225, context prompter 235, semantic similarity analyzer 240, and/or search result outputter 245) can be processor executable instructions that can be executed by a dedicated or shared processor using received inputs. Further, the various components illustrated in FIG. 2 can exist, if at all, across a plurality of computing devices. For example, the context-based text searching module 210 can be included within user device 205, can be remotely included on a server, or can be distributed across a network (e.g., network 150) over a plurality of computing devices (e.g., contextual meaning determiner 220 can be included on a first computing device while semantic similarity analyzer 240 can be included on a second computing device).

A data receiver 215 of the context-based searching module 210 can be configured to receive a request to search for a search term within a document by the user device 205. In embodiments, upon receiving the search request, the document including the search term is accessed by the data receiver 215 over a network (e.g., network 150 of FIG. 1). In embodiments, the data receiver 215 can be configured to pre-process the document upon accessing the document. Pre-processing can include, for example, converting document format (e.g., converting the document from a pdf format to plaintext), structuring the document, and/or performing natural language processing (NLP) techniques on the document such as part of speech (POS) tagging, parsing, lemmatization, syntactic analysis, and semantic analysis.

Upon receiving the document and the search request for the search term, the data is transmitted to contextual meaning determiner 220. The contextual meaning determiner 220 can be configured to identify a set of contextual meanings (e.g., contexts, homonyms) of the search term within the document. Determining contextual meanings of the search term can be completed in any suitable manner.

In some embodiments, contextual meanings of the search term can be determined by analyzing the search term within the document using an ontological structure (e.g., a knowledge graph). In embodiments, the ontological structure can be traversed such that the disambiguation of the search term can be completed. For example, the search term's relation to other concepts within the ontological structure can provide information regarding the contextual meanings of the search term. As an example, if a search term "Bark" is related (e.g., directly or indirectly) to two different concepts within an ontological structure, "Dog" and "Tree," then the two contextual meanings can be derived from the ontological structure based on the concepts related to the search term. In this example, "Dog" and "Tree" may be determined to be the two contextual meanings of the search term "Bark."

In some embodiments, the contextual meaning determiner 220 can be configured to determine different contextual meanings of the search term using context-based clustering. For example, contextual meaning determiner 220 can determine contextual meanings of a given search term by extracting contextual word embedding vectors of the search term and clustering the vectors using a spherical k-means clustering to detect different contextual meanings of the search term. However, in some embodiments, a rule-based and/or statistical-based approach can be used to determine contextual meanings of the search term.

Upon determining the contextual meanings of the search term, a contextual meaning ranker 225 can be configured to order the derived contexts. Ordering the contexts determined by the contextual meaning determiner 220 can be completed in any suitable manner.

In some embodiments, the contexts can be ordered based on relevancy within the document. For example, a number of instances of each contextual use of the search term can be determined and used for the purposes of ordering (e.g., where frequently used contexts are ranked higher). Thus, in embodiments, the order of contexts can be based directly on the number of occurrences of each context within the document. In some embodiments, tf-idf can be used to determine the relevancy of each context of the search term with respect to the document. For example, each use of the search term can be labeled or otherwise designated with a context and tf-idf can be implemented to determine the relevancy of each contextual use of the search term. In some embodiments, relevancy can be based on the location of the used context of the search term within the document. For example, even if a given contextual use of a search term is infrequently used, if the contextual use is apparent in a title, heading, or other significant location within the document, then the contextual use can be higher ranked by the contextual meaning ranker 225.

In some embodiments, contexts can be ordered by the contextual meaning ranker 225 based on user training data 230. The user training data 230 can indicate previous context selections by a user, and can be used for the purpose of ranking. Thus, in embodiments, previous context selections by a user stored in user training data 230 can be used as supervised learning data such that the contextual meaning ranker 225 can order the contexts determined by the contextual meaning determiner 220 based the previous context selections. In some embodiments, the number of instances a given context was previously selected can be determined for each context of the set of contexts determined by the contextual meaning determiner 220, and the contextual meaning ranker 225 can order each context of the set of contexts based on the number of instances each context was selected (e.g., from high to low). In some embodiments, a ratio of context selections (e.g., the number of times each respective context was selected by a user divided by the number of times each respective context was presented to the user) can be determined for each context of the set of contexts and the contextual meaning ranker 225 can order each context of the set of contexts based on the ratio of context selections for each context.

In some embodiments, the user training data 230 can include or indicate preferences of a user and be used for the purposes of ordering the set of contexts. For example, user data (e.g., social media data, employment history, etc.) can be analyzed with respect to the set of contexts such that the set of contexts can be ordered based on user-preferences derived from the user data. As an example, if a first user is a chef as indicated by the user data, contextual meanings related to culinary arts may be ranked relatively higher for the first user within the set of ordered contexts. As a second example, if a second user is a zoologist as indicated by the user data, contextual meanings related to zoology may be ranked relatively higher for the second user (e.g., "Bat" the animal may be ranked higher than "Bat" the equipment used in baseball).

Though this disclosure pertains to the collection of personal data, it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

Figure 4A:
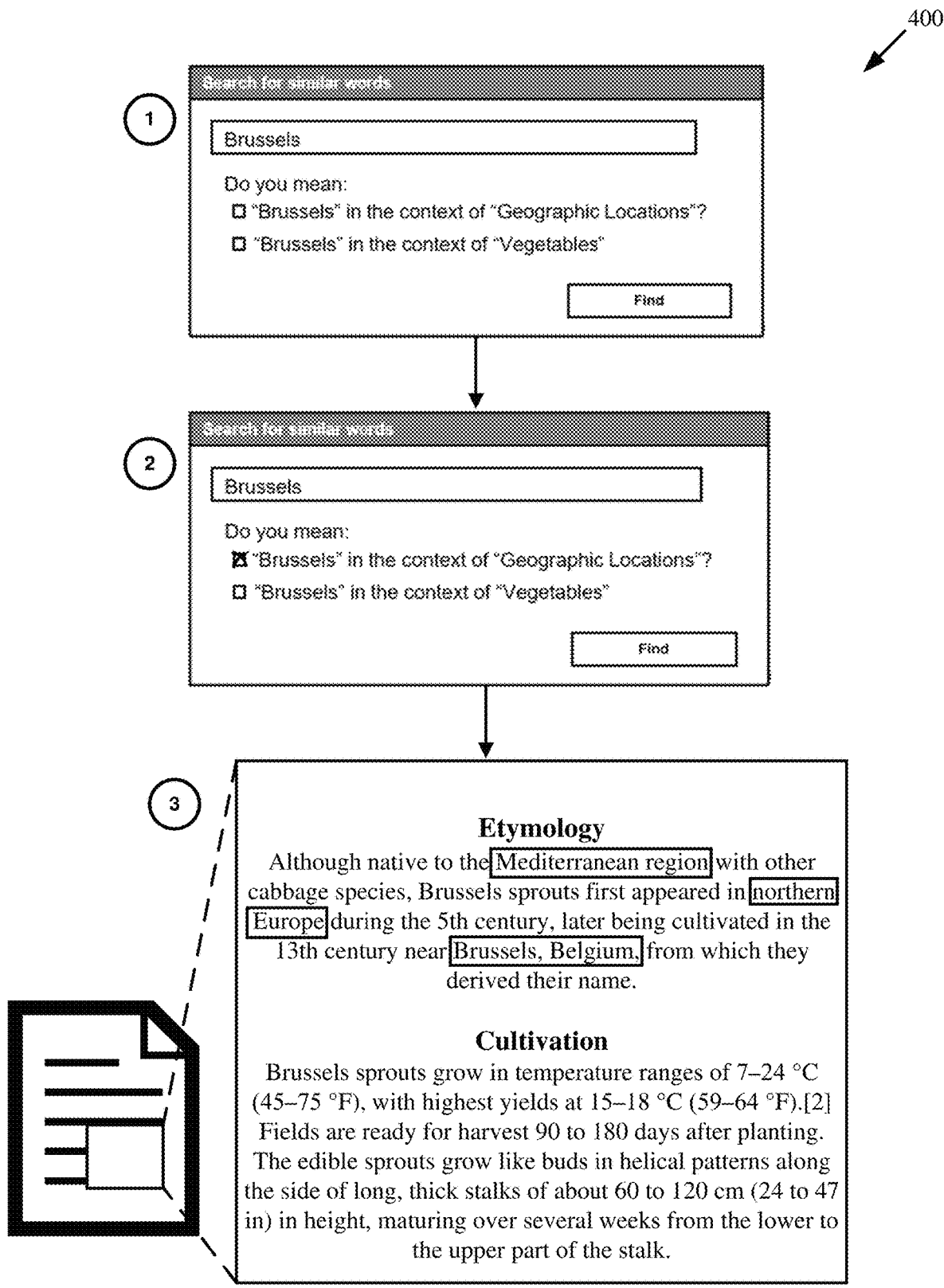
FIG. 4A is a diagram that depicts an example context-based text search, in accordance with embodiments of the present disclosure.
Figure 4B:
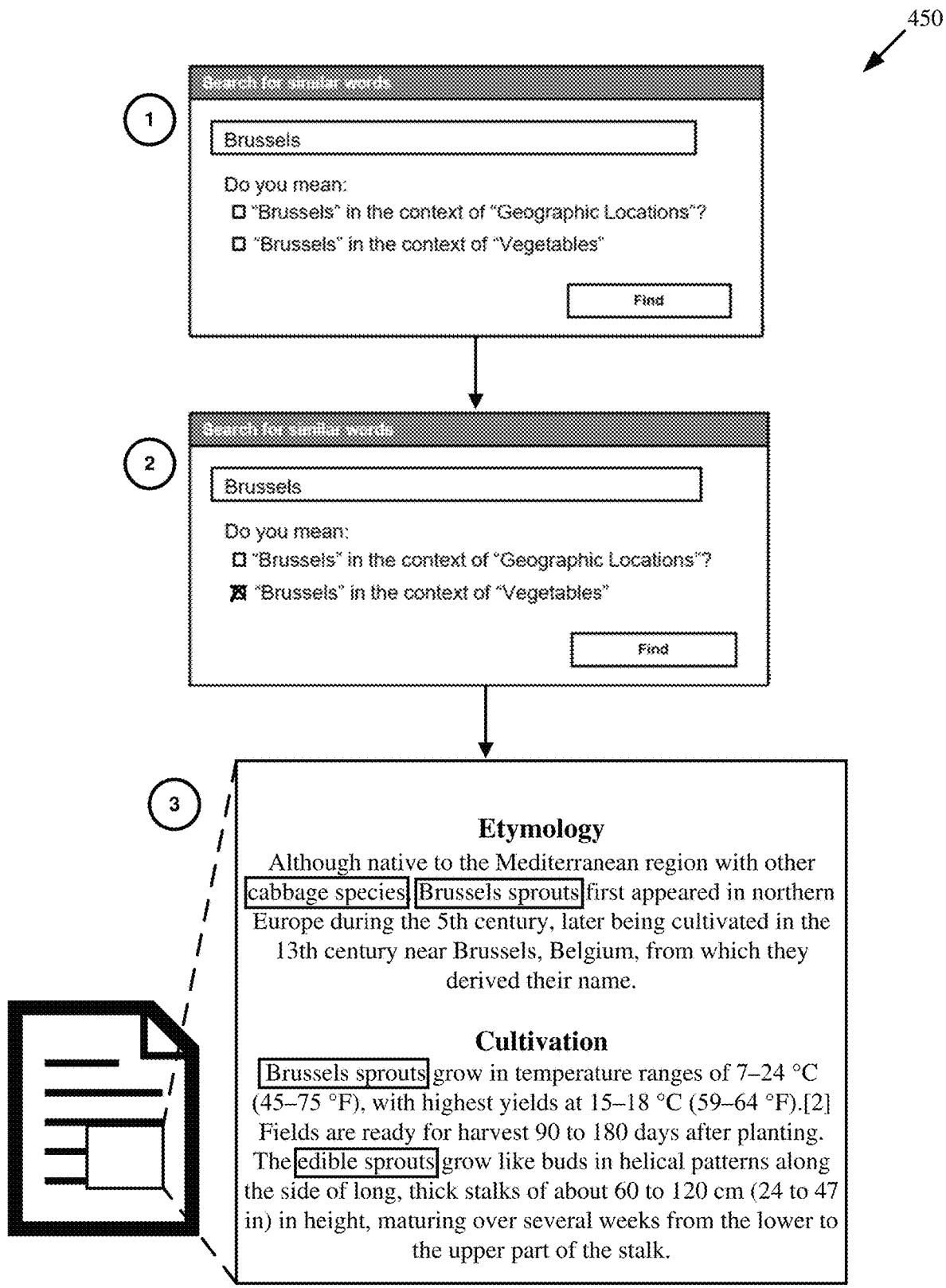
FIG. 4B is a diagram that depicts another example context-based text search, in accordance with embodiments of the present disclosure.

Upon ordering the contexts by the contextual meaning ranker 225, a context prompter 235 can be configured to present the ordered list of contexts to the user. For example, the context prompter 235 can be configured to cause the ordered list of contexts to be displayed to the user on a graphical user interface (GUI). That is, the user can be prompted with an option of disambiguation to select a context of the ordered set of contexts. Example user interfaces illustrating ranked contexts that can be displayed by the context prompter are depicted in FIGS. 4A and 4B.

A context selection is then received from the user device 205. The context selection can be received in any suitable manner. For example, as depicted in FIGS. 4A and 4B, a checkbox on a GUI is used to select a context from the set of ordered contexts. However, the context can be selected in any other manner consistent here (e.g., a touch control, button control, voice command, etc.).

A semantic similarity analyzer 240 can be configured to determine semantically similar terms that relate to the selected context (e.g., or alternatively, semantically similar terms that relate to each context on the list of ordered contexts). Determining semantically similar terms to the selected context of the search term can be completed in any suitable manner.

In some embodiments, bidirectional encoder representations from transformers (BERT) can be used to identify semantically similar terms to the selected context of the search term. In embodiments, an encoded version of each word within the text, including the selected context of the search term, can be generated. Thereafter, a cosine distance between vectoral representations of the selected context of the search term and other words within the document can be calculated to determine semantically similar matches according to Equation 1, presented below.

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \sqrt{\sum_{i=1}^{n} B_i^2}},$$

Equation (1)

According to Equation 1, "A" represents the vectoral representation of the selected search term context and "B" represents the vectoral representation of a respective token (e.g., word) within the document. The cosine distance, "cos(θ)", between the vector representation of the selected search term and vectoral representation of a given token represents the similarity between the search term and the token. This comparison can be completed between the selected context of the search term and each word within the document. Thereafter, in embodiments, words that satisfy a similarity threshold can be selected as semantically similar terms.

However, in embodiments, term frequency-inverse document frequency (TF-idf), topological similarity (e.g., node-based and edge-based similarity based on an ontological structure), statistical similarity (e.g., a vector-based model such as latent semantic analysis (LSA)) and/or other methodologies can be used to determine semantically similar terms to the selected context of the search term by the semantic similarity analyzer 240. Any suitable threshold can be selected such that terms sufficiently close to the selected context of the search term can be determined to be semantically similar terms for presentation to the user.

A search result outputter 245 can be configured to present search results relevant to the selected context of the search term to the user. The search results can include the selected context of the search word and all terms that were determined to be semantically similar to the selected context of the search word. In embodiments, "presenting search results" relates to highlighting, generating bounding boxes around, italicizing, bolding, altering the color of, increasing the font size of, or otherwise emphasizing the relevant terms within the document to be presented to the user. In embodiments, the user can traverse through each relevant search result via user command (e.g., "Enter"). This can allow the user to seamlessly scan through the document to find instances of the selected context of the search term and all semantically similar search terms related to the selected context of the search term.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
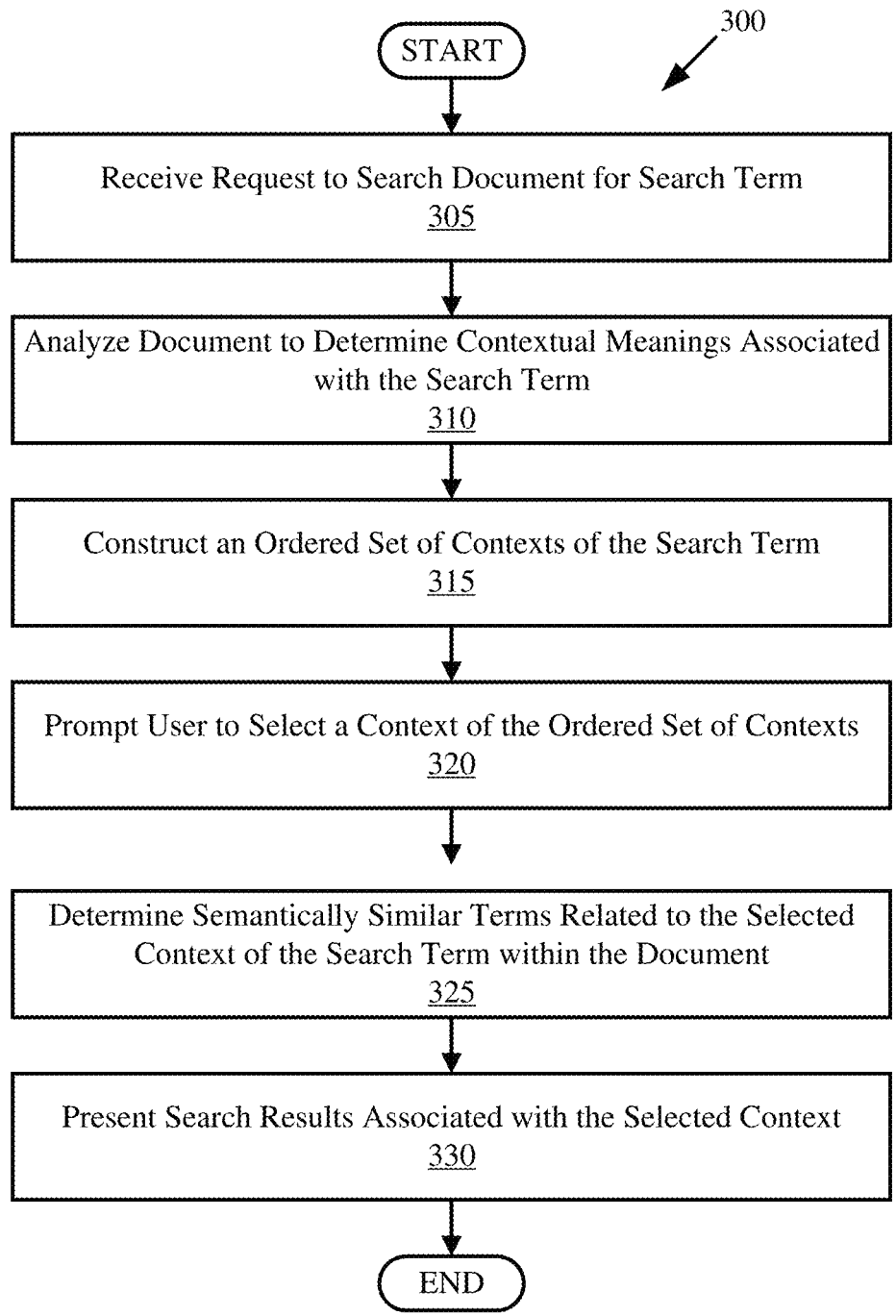
FIG. 3 is a flow-diagram depicting an example method for presenting search results to a user relevant to a selected context of a search term and semantically similar terms related to the selected context of the search term, in accordance with embodiments of the present disclosure.

Referring now to FIG. 3, shown is a flow-diagram illustrating an example method 300 for presenting search results to a user relevant to a selected context of a search term, including semantically similar terms related to the selected context of the search term, in accordance with embodiments of the present disclosure. One or more operations of method 300 can be completed by one or more computing devices (e.g., devices 105, server 135, device 205, context-based text searching module 210).

Method 300 initiates at operation 305, where a request is received to search a document for a search term. The document is then analyzed to determine contextual meanings associated with the search term. This is illustrated at operation 310. Determining contextual meanings of the search term can be completed in the same, or a substantially similar, manner as described with respect to the contextual meaning determiner 220 of FIG. 2. For example, contextual meanings of the search term can be determined using an ontological structure.

An ordered set of contexts of the search term is then constructed. This is illustrated at operation 315. Ordering the set of contexts can be completed in the same, or a substantially similar manner, as described with respect to the contextual meaning ranker 225 of FIG. 2. For example, the set of contexts can be ordered based on relevancy within the document and/or based on user training data 230.

The user is then prompted to select a context of the set of ordered contexts. This is illustrated at operation 320. Prompting the user to select a context can be completed in the same, or a substantially similar manner, as described with respect to the context prompter 235 of FIG. 2. For example, the ordered set of contexts can be displayed to the user on a GUI with an option to select a context of the ordered set of contexts.

Semantically similar terms related to the selected context of the search term within the document are then determined. This is illustrated at operation 325. Determining semantically similar terms related to the selected context can be completed in the same, or a substantially similar manner, as described with respect to the semantic similarity analyzer 240 of FIG. 2. For example, BERT, tf-idf, a rules-based approach, or a statistical approach can be used to determine semantically similar terms to the selected context of the search term.

The search results associated with the selected context are then presented to the user. This is illustrated at operation 330. Thus, the selected context of the search term and semantically similar terms related to the selected context of the search term can be emphasized (e.g., highlighted, bolded, etc.) within the document and the user can be allowed to traverse through each search result via user command.

The aforementioned operations can be completed in any order and are not limited to those described. Additionally, some, all, or none of the aforementioned operations can be completed, while still remaining within the spirit and scope of the present disclosure.

Referring now to FIG. 4A, shown is a diagram 400 illustrating the selection of a context of a search term within a given document and the presentation of search results related to the selected context of the search term, in accordance with embodiments of the present disclosure. The configuration, context options, and search results depicted in FIG. 4A are merely exemplary, and any suitable configuration, context options, and/or search results can be implemented without departing from the spirit and scope of the present disclosure.

Initially, at (1), the user inputs "Brussels" into the search window below "Search for similar words" and the user is prompted with contexts that are determined by analyzing the document (e.g., by context meaning determiner 220 of FIG. 2) for contextual meanings related to the search term "Brussels." Thereafter, at (2), the user selects context "Geographic Locations" by selecting a checkbox proximate to the "Geographic Locations" option. Upon selecting "Find" after checking the "Geographic Locations" checkbox, search results are displayed to the user at (3). In this example, search results for the selected context of the search term and semantically similar terms related to the selected context of the search term include "Mediterranean region," "northern Europe," and "Brussels, Belgium." In this example, "Mediterranean region" and "northern Europe" are terms determined to be semantically similar to the selected context "Geographic Locations" of the search term "Brussels." The user can then traverse the search results via user command (e.g., "Enter," "Space," "Right Click," a voice command, etc.). In this embodiment, bounding boxes surround each search result such that the user can conveniently identify all terms related to the context of the selected search term.

Referring now to FIG. 4B, shown is a diagram 450 illustrating the selection of a second context of the search term depicted in FIG. 4A and the presentation of search results related to the selected context of the search term, in accordance with embodiments of the present disclosure. The configuration, context options, and search results depicted in FIG. 4B are merely exemplary, and any suitable configuration, context options, and/or search results can be implemented without departing from the spirit and scope of the present disclosure.

Initially, at (1), the user inputs "Brussels" into the search window below "Search for similar words" and the user is prompted with contexts that are determined by analyzing the document (e.g., by context meaning determiner 220 of FIG. 2) for contextual meanings related to the search term "Brussels." Thereafter, at (2), the user selects context "Vegetables" by selecting a checkbox proximate to the "Vegetables" option. Upon selecting "Find" after checking the "Vegetables" checkbox, search results are displayed to the user at (3). In this example, search results for the selected context of the search term and semantically similar terms related to the selected context of the search term include "cabbage species," "Brussels sprouts," and "edible sprouts." In this example, "cabbage species" and "edible sprouts" are terms determined to be semantically similar to the selected context "Vegetables" of the search term "Brussels." The user can then traverse the search results via user command (e.g., "Enter," "Space," "Right Click," a voice command, etc.). In this embodiment, bounding boxes surround each search result such that the user can conveniently identify all terms related to the context of the selected search term.

Figure 5:
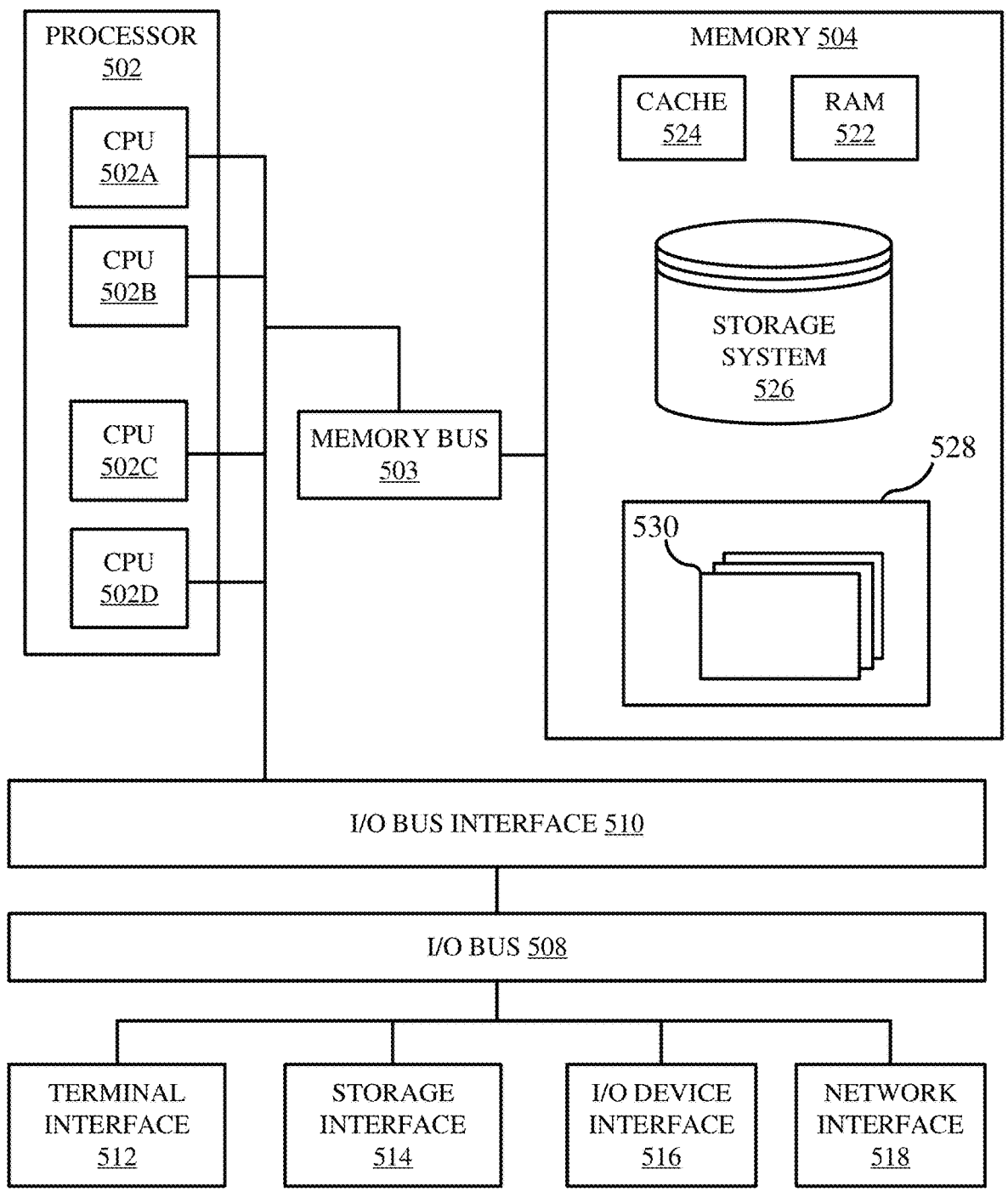
FIG. 5 is a high-level block diagram illustrating an example computer system that can be used in implementing one or more of the methods, tools, modules, and any related functions described herein, in accordance with embodiments of the present disclosure.

Referring now to FIG. 5, shown is a high-level block diagram of an example computer system 501 that may possibly be utilized in various devices discussed herein (e.g., devices 105, server 135, device 205, context-based searching module 210) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502 (also referred to as processors herein), a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

Memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
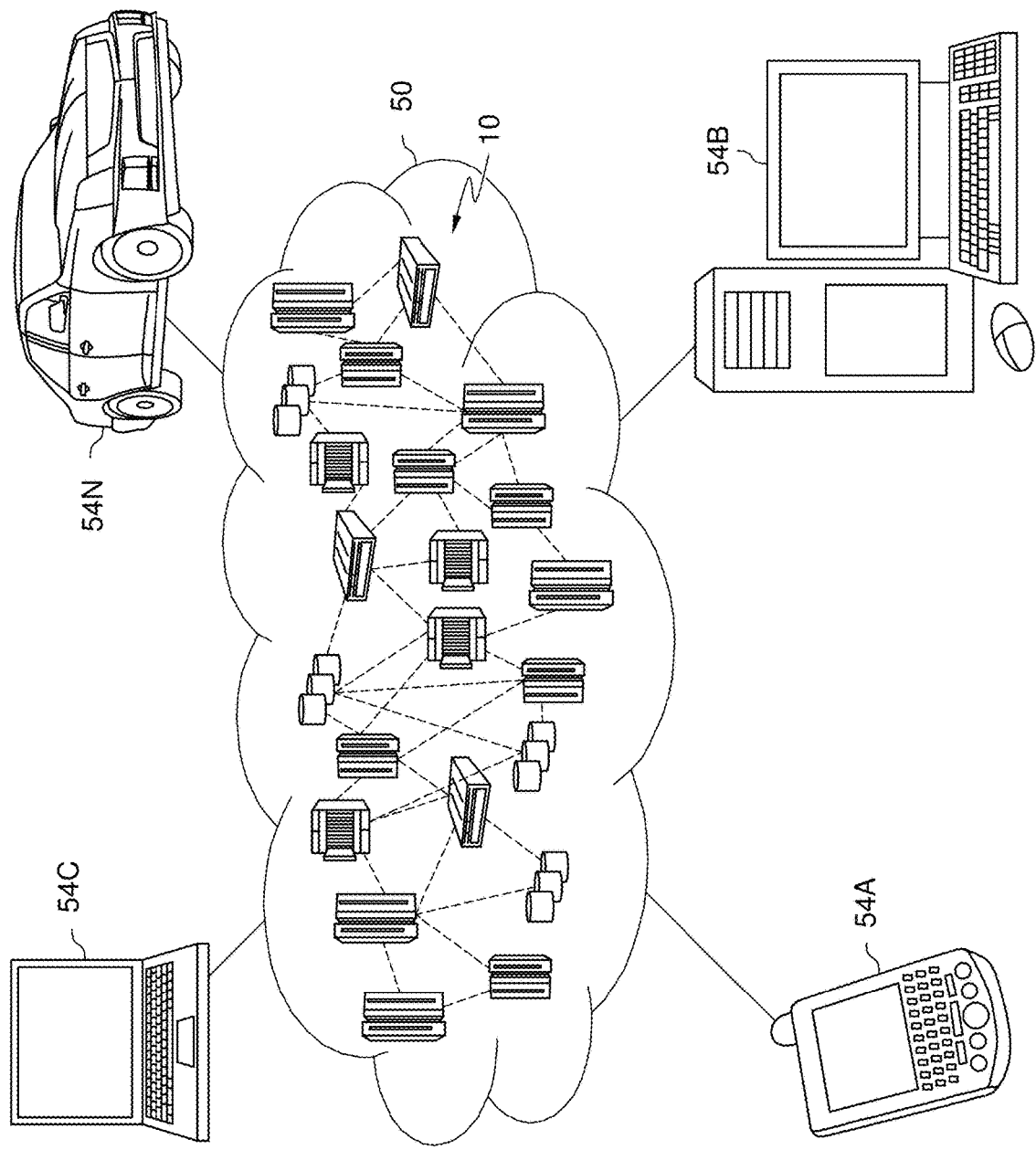
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
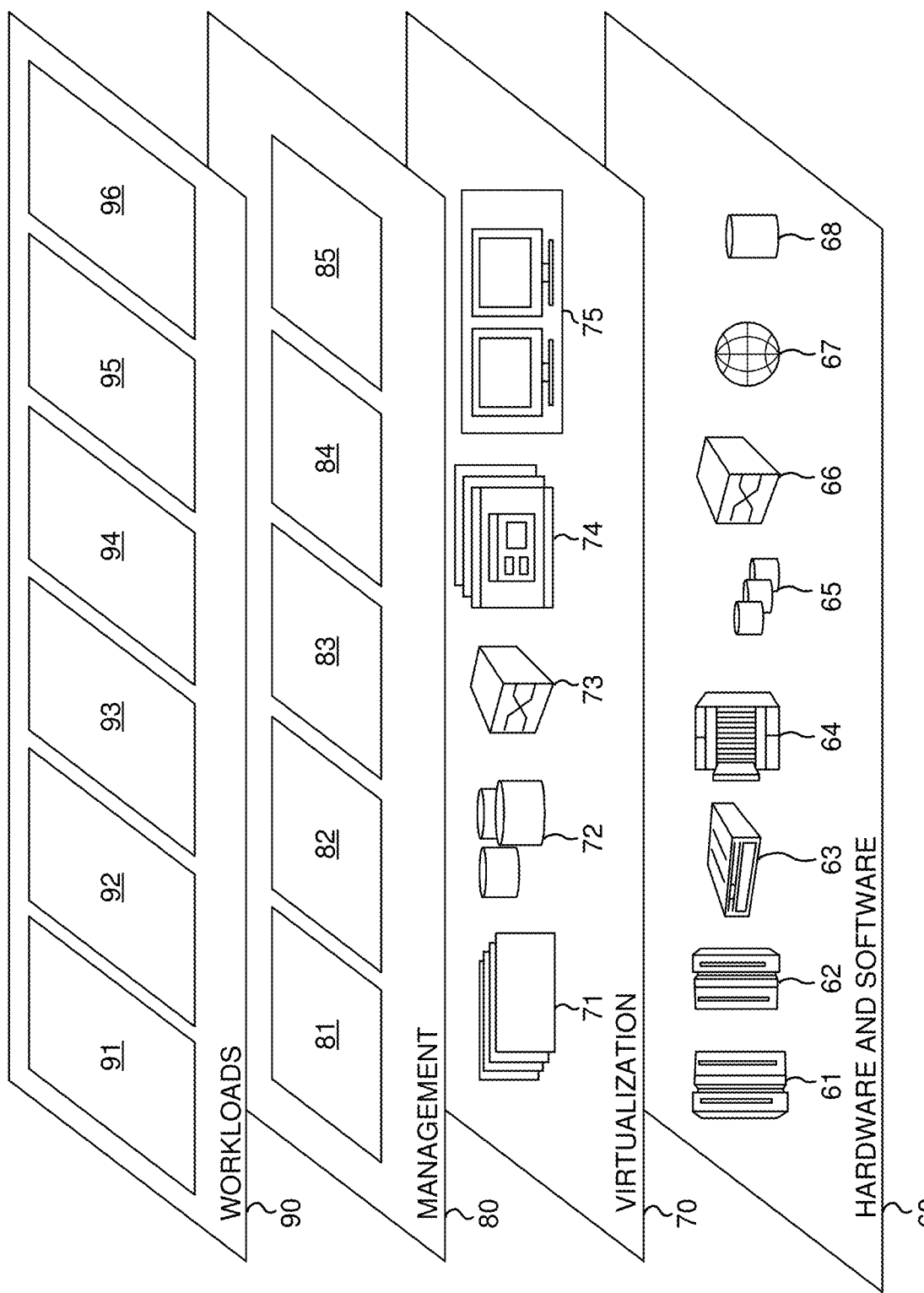
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-based text searching 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving a request from a user to search a document for at least one search term;
   analyzing the document to determine contextual meanings associated with the at least one search term, where analyzing the document to determine the contextual meanings associated with the at least one search term includes analyzing an ontological structure to determine concepts related to the at least one search term within the ontological structure, wherein the concepts are selected as the contextual meanings;
   constructing an ordered set of contexts of the at least one search term;
   prompting an option of disambiguation to the user to select a context of the ordered set of contexts; and
   presenting search results to the user associated with the selected context of the at least one search term.

2. The method of claim 1, wherein constructing the ordered set of contexts is based on relevancy to the user based on previous context selections.

3. The method of claim 1, wherein constructing the ordered set of contexts is based on relevancy with respect to the document.

4. The method of claim 1, wherein the search results include semantically similar terms related to the selected context of the at least one search term.

5. The method of claim 4, wherein the semantically similar terms are determined using bidirectional encoder representations from transformers (BERT).

6. The method of claim 1, wherein constructing the ordered set of contexts is based on relevancy to the user based on user preferences indicated in a set of user training data.

7. A system comprising:
one or more processors; and
one or more computer-readable storage media storing program instructions which, when executed by the one or more processors, are configured to cause the one or more processors to perform a method comprising:
receiving a request from a user to search a document for at least one search term;
analyzing the document to determine contextual meanings associated with the at least one search term, where analyzing the document to determine the contextual meanings associated with the at least one search term includes analyzing an ontological structure to determine concepts related to the at least one search term within the ontological structure, wherein the concepts are selected as the contextual meanings;
constructing an ordered set of contexts of the at least one search term;
prompting an option of disambiguation to the user to select a context of the ordered set of contexts; and
presenting search results to the user associated with the selected context of the at least one search term.

8. The system of claim 7, wherein constructing the ordered set of contexts is based on relevancy to the user based on previous context selections.

9. The system of claim 7, wherein constructing the ordered set of contexts is based on relevancy with respect to the document.

10. The system of claim 7, wherein the search results include semantically similar terms related to the selected context of the at least one search term.

11. The system of claim 10, wherein the semantically similar terms are determined using bidirectional encoder representations from transformers (BERT).

12. The system of claim 7, wherein constructing the ordered set of contexts is based on relevancy to the user based on user preferences indicated in a set of user training data.

13. A computer program product comprising one or more computer readable storage media, and program instructions collectively stored on the one or more computer readable storage media, the program instructions comprising instructions configured to cause one or more processors to perform a method comprising:
receiving a request from a user to search a document for at least one search term;
analyzing the document to determine contextual meanings associated with the at least one search term, where analyzing the document to determine the contextual meanings associated with the at least one search term includes analyzing an ontological structure to determine concepts related to the at least one search term within the ontological structure, wherein the concepts are selected as the contextual meanings;
constructing an ordered set of contexts of the at least one search term;
prompting an option of disambiguation to the user to select a context of the ordered set of contexts; and
presenting search results to the user associated with the selected context of the at least one search term.

14. The computer program product of claim 13, wherein constructing the ordered set of contexts is based on relevancy to the user based on previous context selections.

15. The computer program product of claim 13, wherein constructing the ordered set of contexts is based on relevancy with respect to the document.

16. The computer program product of claim 13, wherein the search results include semantically similar terms related to the selected context of the at least one search term.

17. The computer program product of claim 16, wherein the semantically similar terms are determined using bidirectional encoder representations from transformers (BERT).

* * * * *